No. 852,109. PATENTED APR. 30, 1907.
D. B. EDWARDS.
DRILL.
APPLICATION FILED AUG. 3, 1906.
3 SHEETS—SHEET 1.
Fig. 1.
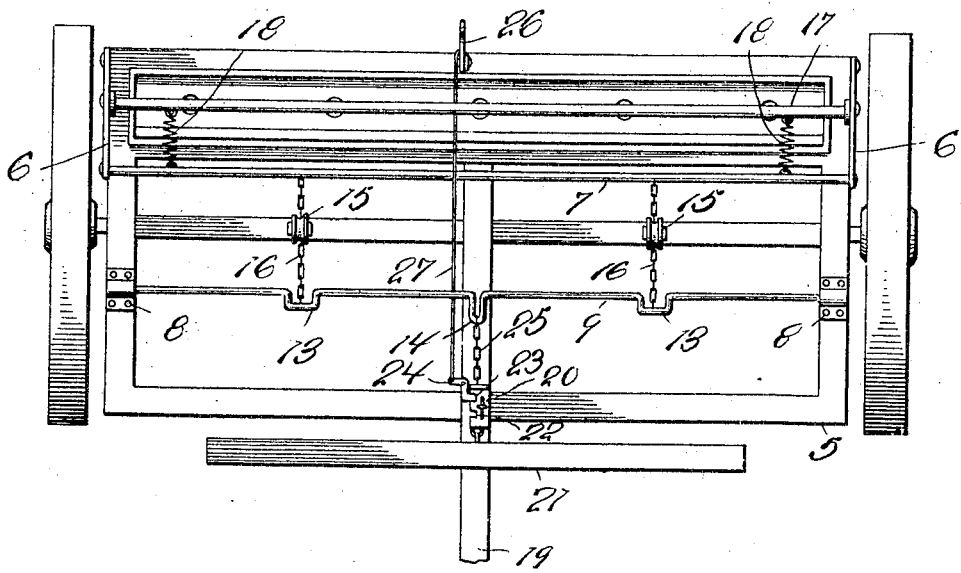
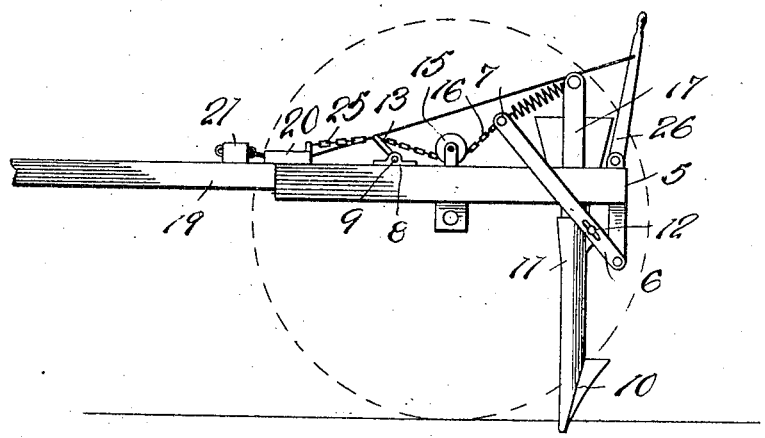
Fig. 2.
Witnesses
G. R. Thomas
H. E. Chandler
Inventor
D. B. Edwards
By
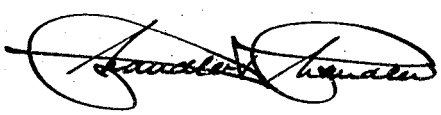
Attorneys No. 852,109. PATENTED APR. 30, 1907.
D. B. EDWARDS.
DRILL.
APPLICATION FILED AUG. 3, 1906.
3 SHEETS—SHEET 2.
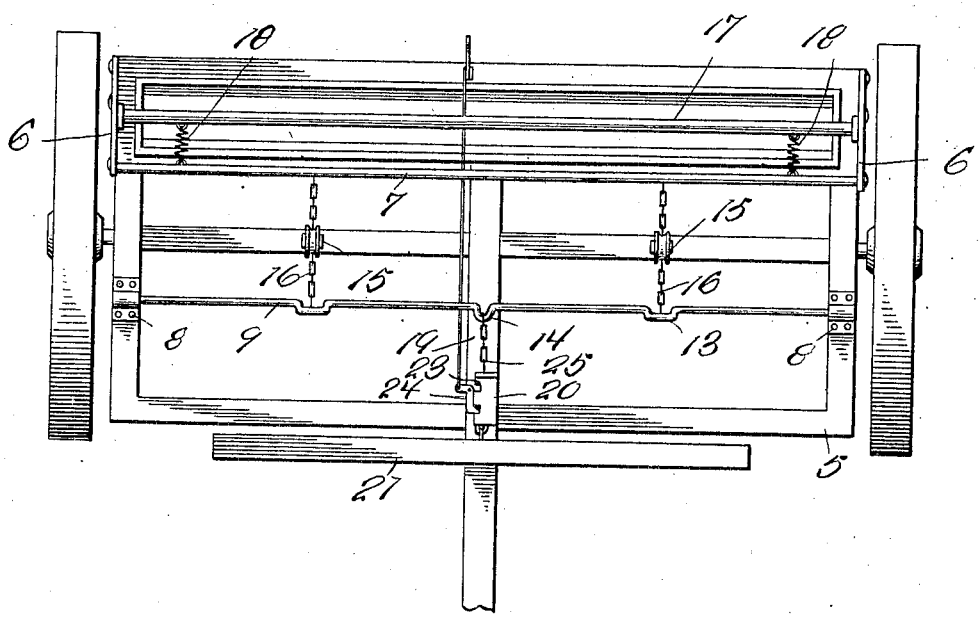
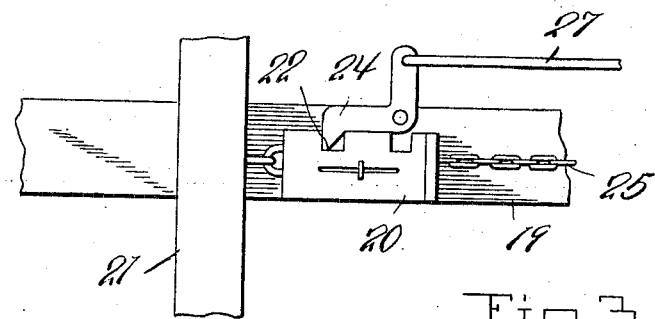

No. 852,109. PATENTED APR. 30, 1907.
D. B. EDWARDS.
DRILL.
APPLICATION FILED AUG. 3, 1906.
3 SHEETS—SHEET 3.
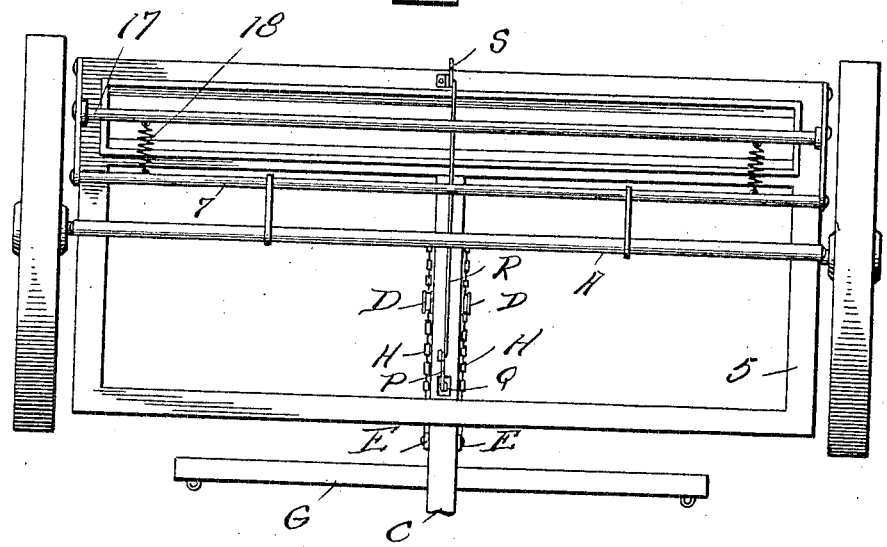
Fig. 5.
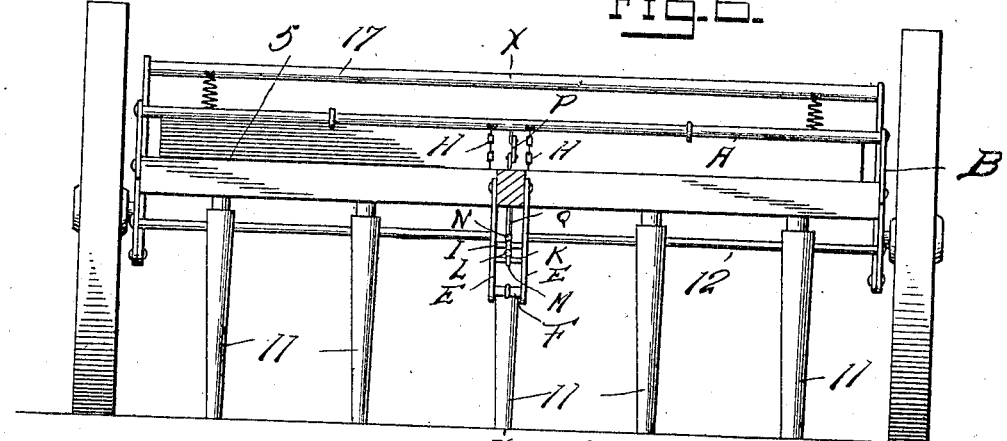
Fig. 6.
Fig. 7.
Witnesses
G. R. Thomas
H. E. Chandler
Inventor
D. B. Edwards
By 
Attorneys

UNITED STATES PATENT OFFICE.

DEAN B. EDWARDS, OF WAUCHOPE, SASKATCHEWAN, CANADA.

DRILL.

No. 852,109.  Specification of Letters Patent.  Patented April 30, 1907.

Application filed August 3, 1906. Serial No. 329,063.

*To all whom it may concern:*

Be it known that I, DEAN B. EDWARDS, a subject of the King of England, residing at Wauchope, in the Province of Saskatchewan, Dominion of Canada, have invented certain new and useful Improvements in Drills; and I do hereby declare the following to be a full, clear, and exact description of the invention, such as will enable others skilled in the art to which it appertains to make and use the same.

This invention relates to farm implements and more particularly to drills and has for its object to provide a drill in which the manually operable mechanism for moving the shoes into and out of the ground will be eliminated, a mechanism operable by the team drawing the drill being substituted therefor. Other objects and advantages will be apparent from the following description.

In the drawings forming a portion of this specification and in which like numerals of reference indicate similar parts in the several views, Figure 1 is a top plan view of the present invention. Fig. 2 is an end elevation. Fig. 3 is a detail view showing the dog and the operating rod connected therewith. Fig. 4 is a view similar to Fig. 1, showing the parts in the position in which they occupy when the shoes are raised into inoperative position. Fig. 5 is an elevational view of a modified form of the invention. Fig. 6 is a front view of the structure shown in Fig. 5. Fig. 7 is a detail sectional view on line *x—x* of Fig. 6, showing the arrangement of the latch rib.

Referring now to the drawings, there is shown a planter including a frame 5 to which there are connected shoes 10 for movement into and out of the ground, these shoes being carried by spouts 11 which are pivoted upon a shaft 12. Levers 6 extend upwardly from the shaft for movement therewith, and these levers are connected at their upper ends by means of a rod 7.

Boxings 8 are mounted upon the frame, and journaled therein, there is a longitudinally extending shaft 9 having spaced cranks 13 therein and a crank 14 located at its center and between the first named cranks. Pulleys 15 are journaled vertically upon the frame and have engaged therewith chains 16 connected at their forward ends with the cranks 13 and at their rearward ends with the rod 7. An upwardly extending supplemental frame 17 is secured to the frame 5 and has secured thereto helical springs 18, which are also secured to the rod 7, these springs being arranged to hold the rod yieldably against forward movement and with the shoes 10 in operative position, though it will be understood that the springs will allow the shoes to move upwardly should they strike any solid obstruction.

Connected with the frame 5, there is a draft beam 19 which extends longitudinally of the frame from the front to the rear thereof and which also projects beyond the front and slidably mounted upon this beam, there is a block 20 having a double tree 21 pivoted thereupon at its forward end. The block is provided with a pair of longitudinally spaced sockets 22 and 23 in one of its side edges, and pivoted upon the beam 19 there is a dog 24 adapted for engagement in the sockets interchangeably to hold the block against movement, it being understood that the block is movable slidably to bring its sockets successively into position to receive the dog.

Chains 25 are connected with the central crank 14 of the shaft 9 and with the block 20 and the arrangement is such that when the block is moved forwardly, the shaft will be moved to move the rod 7 forwardly and downwardly through the medium of the chains 16, thus bringing the shoes 10 into the ground. A hand lever 26 is pivoted upon the beam 19 within reach of the operator of the implement and is connected with the dog 24 by means of a rod 27 for operation of the dog, and it will thus be seen that when it is desired to raise the shoes, the dog being in the forward socket 22, it is but necessary to move the lever to bring the dog out of the socket when the block 20 will be moved backward by the springs to raise the shoes as just described, and the latter may be held in raised position by operating the handle 26 to bring the dog into the rearward socket 23. When it is desired to lower the shoes, it is but necessary to move the dog out of operative position when the forward shaft of the team will move the block 20 forwardly and move the shoes into operative position when the dog 24 may be moved into the socket 23.

In Figs. 5—7 there is shown a modified form of the invention, in which a rod A has angular end portions B pivoted to the frame 5 and this rod is connected with the rod 7 for simultaneous movement therewith. A central draft beam C is provided, and has pulleys D journaled upon its opposite side faces. Depending hangers E are pivoted at their upper ends to the side faces of the draft beam and have a transverse bar F engaged in their lower ends, with which there is connected a whiffle tree G. Chains H are engaged beneath the pulleys D and are secured at their rearward ends to the rod A and at their forward ends are connected with the bar F, and engaged transversely in the hangers E above the bar F, there are a pair of upper and lower spaced rods I and K respectively.

An arm L extends downwardly and forwardly from the frame, and projects between the rods I and K, cross-pieces M being engaged through the arm to limit the movement of the hangers, as will be readily understood, through engagement of these crosspieces by the rods I and K, and pivoted to the arm L for vertical movement there is a latch rod N having depending projections O and $O^2$ in spaced relation, these projections having upwardly convergent mutually adjacent faces and straight opposite faces O' and O'' respectively. An angle lever P is pivoted upon the draft beam C and has a depending link Q connected with one of its arms and with the latch rod N, while the rearwardly extending rod R connects the other arm of the angle lever with a hand lever S corresponding to the lever 26.

As will be seen from the drawings, the hangers E are movable to engage the rod I forwardly of the forward projection O or rearwardly of the rearward projection $O^2$, and the hand lever S may be operated to raise the rod N and bring both of these projections out of position for engagement by the rod I.

It will thus be seen that forward movement of the lower ends of the hangers resultant from the pull of the team, will bring the rod I forwardly of the projection O, the latter preventing rearward movement of the hangers, and the shoes will thus be forced into the ground until the team is pulled up and the latch rod raised, when the springs 18 will tend to move the shoes out of the ground and their action will engage the rod I behind the rearward projection $O^2$. The shoes will thus be held out of the ground until the latch rod is again raised.

What is claimed is:

1. In a planter, the combination with a frame, of shoes connected therewith for movement into and out of operative position, means for holding the shoes yieldably in operative position, a whiffle tree slidably connected with the frame, connections between the shoes and whiffle tree for movement of the shoes into inoperative position when the whiffle tree is slid in one direction, and means for holding the whiffle tree at times against movement and with the shoes in operative position and at times with the shoes in inoperative position.

2. In a machine of the class described, the combination with a frame, of ground-treating devices connected with the frame for movement into and out of operative position, springs arranged to hold said devices yieldably in operative position, a shaft journaled upon the frame, connections between the shaft and ground-treating devices for movement of the latter against the action of the springs when the shaft is moved, a movable member connected with the frame, connections between the member and shaft for movement of the shaft to move the groundtreating devices when the member is moved, means for holding the member at times with the ground-treating devices in operative position and at times with them in inoperative position, a whiffletree connected with the member, and means for moving the memberholding means into and out of operative position.

In testimony whereof, I affix my signature, in presence of two witnesses.

DEAN B. EDWARDS.

Witnesses:
E. H. MALSTED,
A. P. McNAUGHTON.